(12) United States Patent
Kamon et al.

(10) Patent No.: US 11,389,966 B2
(45) Date of Patent: Jul. 19, 2022

(54) POWER SUPPLY APPARATUS

(71) Applicants: KAWASAKI JUKOGYO KABUSHIKI KAISHA, Kobe (JP); KAWASAKI ROBOTICS GMBH, Neuss (DE)

(72) Inventors: Masayuki Kamon, Akashi (JP); Nobuyasu Shimomura, Kobe (JP); Noboru Takagi, Neuss (DE)

(73) Assignees: KAWASAKI JUKOGYO KABUSHIKI KAISHA, Kobe (JP); KAWASAKI ROBOTICS GMBH, Neuss (DE)

( * ) Notice: Subject to any disclaimer, the term of this patent is extended or adjusted under 35 U.S.C. 154(b) by 214 days.

(21) Appl. No.: 16/613,927

(22) PCT Filed: May 15, 2018

(86) PCT No.: PCT/JP2018/018718
§ 371 (c)(1),
(2) Date: Nov. 15, 2019

(87) PCT Pub. No.: WO2018/212167
PCT Pub. Date: Nov. 22, 2018

(65) Prior Publication Data
US 2021/0331597 A1 Oct. 28, 2021

(30) Foreign Application Priority Data
May 15, 2017 (JP) .............................. JP2017-096721

(51) Int. Cl.
*G06F 17/00* (2019.01)
*B25J 13/08* (2006.01)
(Continued)

(52) U.S. Cl.
CPC ............. *B25J 13/08* (2013.01); *B25J 11/008* (2013.01); *B25J 17/0208* (2013.01); *B25J 19/023* (2013.01); *B60L 53/37* (2019.02)

(58) Field of Classification Search
CPC ...... B25J 13/08; B25J 11/008; B25J 17/0208; B25J 19/023; B60L 53/37; B60L 53/35;
(Continued)

(56) References Cited

U.S. PATENT DOCUMENTS 6,157,162 A 12/2000 Hayashi et al.
9,056,555 B1 6/2015 Zhou
(Continued)

FOREIGN PATENT DOCUMENTS

| CN | 103425073 A | 12/2013 |
|---|---|---|
| JP | 2012-120402 A | 6/2012 |
| JP | 2016-103938 A | 6/2016 |

*Primary Examiner* — Ronnie M Mancho
(74) *Attorney, Agent, or Firm* — Oliff PLC

(57) ABSTRACT

A power supply apparatus includes: a power supply portion connected to a power receiving portion of an electrical apparatus and configured to supply electric power to the power receiving portion; an arm including a tip end at which the power supply portion is provided, the arm further including at least one of a linear motion joint portion and a rotational joint portion; and a controller. The controller controls at least one of the linear motion joint portion and the rotational joint portion to move the arm such that the power supply portion is connected to the power receiving portion.

13 Claims, 7 Drawing Sheets

(51) Int. Cl.
*B60L 53/37* (2019.01)
*B25J 11/00* (2006.01)
*B25J 17/02* (2006.01)
*B25J 19/02* (2006.01)

(58) Field of Classification Search
CPC ..... Y02T 10/7072; Y02T 90/12; Y02T 10/70; H02J 7/00
USPC .......................................................... 701/1
See application file for complete search history.

(56) References Cited

U.S. PATENT DOCUMENTS

| | | | |
|---|---|---|---|
| 9,266,440 B2* | 2/2016 | Gao | B25J 13/085 |
| 10,052,962 B2* | 8/2018 | Danger | H02J 7/0027 |
| 2012/0286730 A1* | 11/2012 | Bonny | B60L 53/35 |
| | | | 320/109 |
| 2013/0076902 A1* | 3/2013 | Gao | H01R 13/6683 |
| | | | 348/148 |
| 2018/0001777 A1* | 1/2018 | Kilic | B60L 53/14 |

\* cited by examiner

POWER SUPPLY APPARATUS

TECHNICAL FIELD

The present invention relates to a power supply apparatus, and in particular, relates to a power supply apparatus configured to supply electric power to an electrical apparatus.

BACKGROUND ART

A car power supply facility described in PTL 1 is known as a conventional power supply apparatus. The car power supply facility is configured such that a power supply apparatus that is a self-propelled robot moves to a position facing a power receiving portion of a car and supplies electric power to the power receiving portion.

CITATION LIST

Patent Literature

PTL 1: Japanese Laid-Open Patent Application Publication No. 2016-103938

SUMMARY OF INVENTION

Technical Problem

In the car power supply facility of PTL 1, since the self-propelled robot is used as the power supply apparatus, control for moving the power supply apparatus to the power receiving portion of the car becomes complex.

The present invention was made to solve the above problem, and an object of the present invention is to provide a power supply apparatus capable of more easily moving a power supply portion to a power receiving portion.

Solution to Problem

A power supply apparatus according to an aspect of the present invention includes: a power supply portion connected to a power receiving portion of an electrical apparatus and configured to supply electric power to the power receiving portion; an arm including a tip end at which the power supply portion is provided, the arm further including at least one of a linear motion joint portion and a rotational joint portion; and a controller. The controller controls at least one of the linear motion joint portion and the rotational joint portion to move the arm such that the power supply portion is connected to the power receiving portion.

The power supply apparatus may further include a camera provided at the arm. The controller may control at least one of the linear motion joint portion and the rotational joint portion based on an image of the camera to move the arm such that the power supply portion is connected to the power receiving portion.

The power supply apparatus may further include a caster provided at a lower portion of the arm such that the arm is movable.

The power supply apparatus may further include a fixing portion provided at the arm and configured to fix the arm to the electrical apparatus.

The power supply apparatus may further include a storage unit configured to store a position of the power receiving portion, the position being taught by a mobile terminal or manually. The controller may move the arm based on the position of the power receiving portion stored in the storage unit such that the power supply portion is connected to the power receiving portion.

The power supply apparatus may further include an error absorbing portion configured to displace the power supply portion in accordance with reaction force generated when inserting the power supply portion into the power receiving portion.

In the power supply apparatus, the arm may include: a base portion fixed to a ground surface and extending in a vertical direction; a first arm portion coupled to the base portion by the linear motion joint portion and extending in a direction intersecting with the base portion; and a second arm portion coupled to the first arm portion by the rotational joint portion and configured to rotate about a rotation axis, the rotation axis being provided in a linear movement direction of the first arm portion and extending in a direction intersecting with the first arm portion.

Advantageous Effects of Invention

The present invention has an effect of being able to more easily move the power supply portion of the power supply apparatus to the power receiving portion.

The above object, other objects, features, and advantages of the present invention will be made clear by the following detailed explanation of preferred embodiments with reference to the attached drawings.

DESCRIPTION OF EMBODIMENTS

Figure 1:
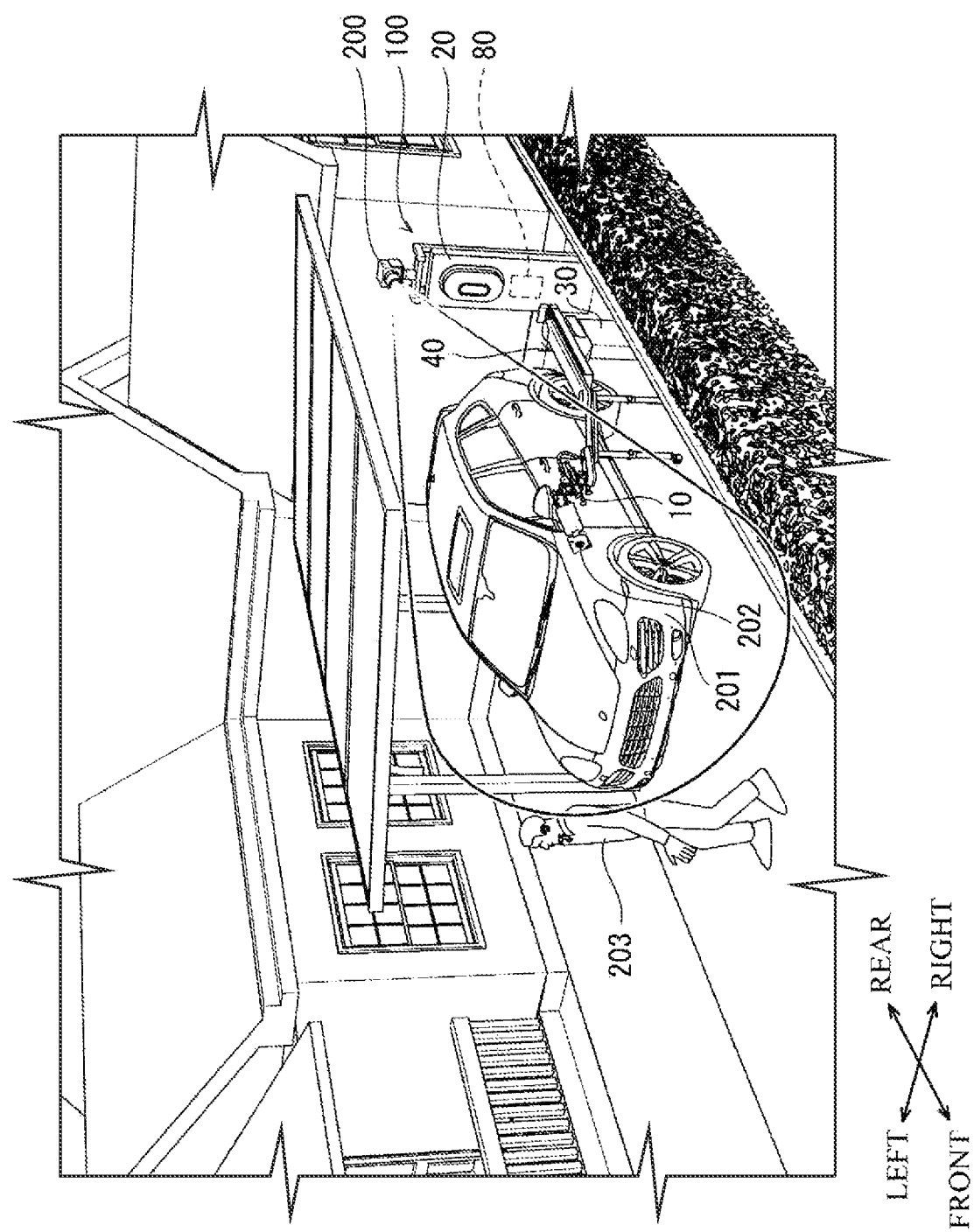
FIG. 1 is a perspective view showing a power supply apparatus according to Embodiment 1 of the present invention.

Hereinafter, embodiments of the present invention will be specifically described with reference to the drawings. In the following description and the drawings, the same reference signs are used for the same or corresponding components, and a repetition of the same explanation is avoided.

Embodiment 1

First, the configuration of a power supply apparatus 100 according to Embodiment 1 of the present invention will be described with reference to FIG. 1. For example, the power supply apparatus 100 and a detection sensor 200 are arranged outdoors, such as a parking lot outside a house. A power supply portion 10 of the power supply apparatus 100 is connected to a power receiving portion 202 of a car 201 in the parking lot, and the power supply apparatus 100 supplies electric power. In the following description, a power supply target to which the power supply apparatus 100 supplies electric power is the car 201. However, the power supply target is not limited to this and may be an electrical apparatus, such as a robot, used at home.

The detection sensor 200 is a sensor configured to detect the car 201 and a person 203 in the parking lot. For example, the detection sensor 200 detects these at all times. For example, a camera is used as the detection sensor 200. The detection sensor 200 is arranged so as to be able to take an image of the car 201 and the person 203 around the car 201. It should be noted that the detection sensor 200 may include an image processing unit (not shown) and may be able to detect the position of the car 201 based on the image taken by the camera. The image processing unit may be provided at a controller 80 of the power supply apparatus 100.

Next, the configuration of the power supply apparatus 100 will be described with reference to FIG. 2. The power supply apparatus 100 is constituted by a main body 20, a base portion 30, and an articulated arm 40 provided at the base portion 30. For example, the controller 80 configured to control the operation of the articulated arm 40 is incorporated in the main body 20. It should be noted that the controller 80 may be provided outside the main body 20.

The base portion 30 is fixed to a ground surface of the parking lot, has a rectangular solid shape, and extends in a vertical direction. For example, the base portion 30 is arranged at a rear-right side in the parking lot.

The arm 40 is configured such that a plurality of (in the present embodiment, three) arm portions 41, 42, and 43 are lined up in series from a base end side toward a tip end side. The base portion 30 and the arm portion (first arm portion 41) located at the most base end side are coupled to each other through a joint portion so as to be displaceable relative to each other. The adjacent arm portions 41 and 42 are coupled to each other through a joint portion so as to be displaceable relative to each other. The adjacent arm portions 42 and 43 are coupled to each other through a joint portion so as to be displaceable relative to each other. The power supply portion 10 is provided at the arm portion (third arm portion 43) located at the most tip end side. Each of the arm portions 41, 42, and 43 has a long flat plate shape and is arranged horizontally or substantially horizontally. It should be noted that the arm portions 41, 42, and 43 are referred to as a first arm portion 41, a second arm portion 42, and a third arm portion 43 in order from the base end side.

The first arm portion 41 extends in a front-rear direction and is coupled to the base portion 30 by a first linear motion joint portion 44. The first linear motion joint portion 44 is constituted by a linear motion mechanism which includes a linear actuator (such as an air cylinder) or a driving source (such as a servomotor) and linearly moves the first arm portion 41 in the front-rear direction relative to the base portion 30 by the linear actuator or the driving source. The first arm portion 41 is arranged on the base portion 30. The first arm portion 41 is provided on a part of the base portion 30 which part extends in the front-rear direction. As the first arm portion 41 moves rearward, and an overlap between the first arm portion 41 and the base portion 30 increases, the length of the arm 40 decreases in the front-rear direction. In contrast, as the first arm portion 41 moves forward, and the overlap between the first arm portion 41 and the base portion 30 decreases, the length of the arm 40 increases in the front-rear direction.

A base end of the second arm portion 42 is placed on a tip end of the first arm portion 41 from below, and the second arm portion 42 is coupled to the first arm portion 41 by a first rotational joint portion 45. The first rotational joint portion 45 is constituted by a rotary mechanism which includes a driving source, such as a servomotor, and rotates the second arm portion 42 relative to the first arm portion 41 by the driving source around a rotation axis extending in a direction intersecting with the first arm portion 41 and the second arm portion 42. With this, the second arm portion 42 rotates about the rotation axis provided in a linear movement direction of the first arm portion 41 and extending in the direction intersecting with the second arm portion 42. For example, when the first arm portion 41 and the second arm portion 42 are arranged horizontally, the rotation axis of the first rotational joint portion 45 extends in the vertical direction.

A base end of the third arm portion 43 is placed on a tip end of the second arm portion 42 from above, and the third arm portion 43 is coupled to the second arm portion 42 by a second rotational joint portion 46. The second rotational joint portion 46 is constituted by a rotary mechanism which includes a driving source, such as a servomotor, and rotates the third arm portion 43 relative to the second arm portion 42 by the driving source around a rotation axis extending in the direction intersecting with the second arm portion 42 and the third arm portion 43. For example, when the second arm portion 42 and the third arm portion 43 are arranged horizontally, the rotation axis of the second rotational joint portion 46 extends in the vertical direction.

The second arm portion 42 is supported by arm supporting portions 47 and 48 in the vertical direction. For example, the arm supporting portions 47 and 48 are rod-shaped members and extend in the vertical direction, and upper ends of the arm supporting portions 47 and 48 are connected to the second arm portion 42. A plurality of (in the present embodiment, two) arm supporting portions (47, 48) are provided. One of the arm supporting portions (i.e., the first arm supporting portion 47) is arranged coaxially with the rotation axis of the first rotational joint portion 45, and the other arm supporting portion (i.e., the second arm supporting portion 48) is arranged coaxially with the rotation axis of the second rotational joint portion 46. The length of the first arm supporting portion 47 and the length of the second arm supporting portion 48 are set such that the power supply portion 10 provided at a tip end of the third arm portion 43 coupled to the second arm portion 42 faces the power receiving portion 202 (FIG. 1) of the car 201 (FIG. 1).

A caster 47a is attached to a lower end of the first arm supporting portion 47, and a caster 48a is attached to a lower end of the second arm supporting portion 48. The casters 47a and 48a are arranged on the parking lot. The caster 47a is rotatable around a rotation axis that is coaxial (in the vertical direction) with the arm supporting portion 47, and the caster 48a is rotatable around a rotation axis that is coaxial (in the vertical direction) with the arm supporting portion 48. Further, the caster 47a includes a wheel that is rotatable around a rotation axis extending in a direction (horizontal direction) perpendicular to the arm supporting portion 47, and the caster 48a includes a wheel that is rotatable around a rotation axis extending in a direction (horizontal direction) perpendicular to the arm supporting portion 48. The first arm supporting portion 47 and the second arm supporting portion 48 are movable by the casters 47a and 48a toward front, rear, left, and right sides in the horizontal direction. As above, since the arm 40 is supported by the arm supporting portions 47 and 48 to which the casters 47a and 48a are respectively attached, the arm portions 41, 42, and 43 and the motors of the joint portions can be downsized.

The power supply portion 10 is attached to the third arm portion 43 by a second linear motion joint portion 49 provided at the tip end of the third arm portion 43. The second linear motion joint portion 49 includes: a linear actuator (such as an air cylinder) or a driving source (such as a servomotor); a holder 49a; and a slider 49b configured to be slidable relative to the holder 49a.

The holder 49a is attached onto the third arm portion 43 by a rod-shaped holder supporting portion 50 extending in a direction perpendicular to the third arm portion 43. The holder 49a has a long plate-shaped body and extends such that a longitudinal direction of the holder 49a is parallel to an extending direction (longitudinal direction) of the third arm portion 43. A tip end of the holder 49a projects forward beyond the tip end of the third arm portion 43. The holder 49a is inclined in the vertical direction such that the tip end thereof is located lower than a base end thereof. In accordance with a positional relation between the power supply portion 10 and the power receiving portion 202, the holder 49a may be horizontal or may be inclined in the vertical direction such that the tip end thereof is located higher than the base end thereof.

The slider 49b has a plate-shaped body, is arranged on the holder 49a, and is movable between the tip end and base end of the holder 49a. The power supply portion 10 is attached onto the slider 49b. With this, the power supply portion 10 is held on the holder 49a so as to be slidable relative to the holder 49a.

When the power supply portion 10 slides toward the base end of the holder 49a, the power supply portion 10 is arranged on the holder 49a. In contrast, when the power supply portion 10 slides toward the tip end of the holder 49a, the power supply portion 10 projects forward beyond a tip end surface of the holder 49a. Since the power supply portion 10 slides on the holder 49a as above, the power supply portion 10 can move in parallel with the extending direction of the third arm portion 43 while maintaining a fixed angular posture.

One end of a power supply line 51 is connected to a base end of the power supply portion 10. The power supply line 51 is routed through the arm 40 and the base portion 30, and the other end of the power supply line 51 is connected to an AC power supply (not shown). With this, electric power is supplied from the AC power supply to the power supply portion 10. A fixing portion 60 and a camera 70 are provided around the power supply portion 10.

The fixing portion 60 is a member configured to fix the arm 40 to the car 201. For example, a vacuum suction body is used as the fixing portion 60. The fixing portion 60 includes suction pads 61. The suction pads 61 are connected to a vacuum generator (not shown), such as a vacuum pump or CONVUM (trademark), through a pipe 62. For example, an on-off valve (not shown) is provided at the pipe 62. When the on-off valve opens or closes the pipe 62, sticking of the suction pads 61 by negative pressure or cancellation of the sticking of the suction pads 61 is performed.

The fixing portion 60 is provided with, for example, a plurality of (in the present embodiment, four) suction pads 61. In a direction perpendicular to an inclination direction of the holder 49a of the power supply portion 10, the four suction pads 61 are arranged around the power supply portion 10 point-symmetrically about the power supply portion 10. For example, the suction pads 61 are attached to the tip end of the third arm portion 43 through the holder 49a of the power supply portion 10 and is arranged forward beyond the tip end of the holder 49a. When the suction pads 61 stick to the car 201, the power supply portion 10 is positioned.

The camera 70 is an imaging portion configured to take an image of the power receiving portion 202 (FIG. 1) coupled to the power supply portion 10. For example, the camera 70 is provided on the power supply portion 10 and attached to the tip end of the third arm portion 43. The camera 70 is connected to an image processing unit 84 (FIG. 3), and the image taken by the camera 70 is output to the image processing unit 84.

Figure 3:
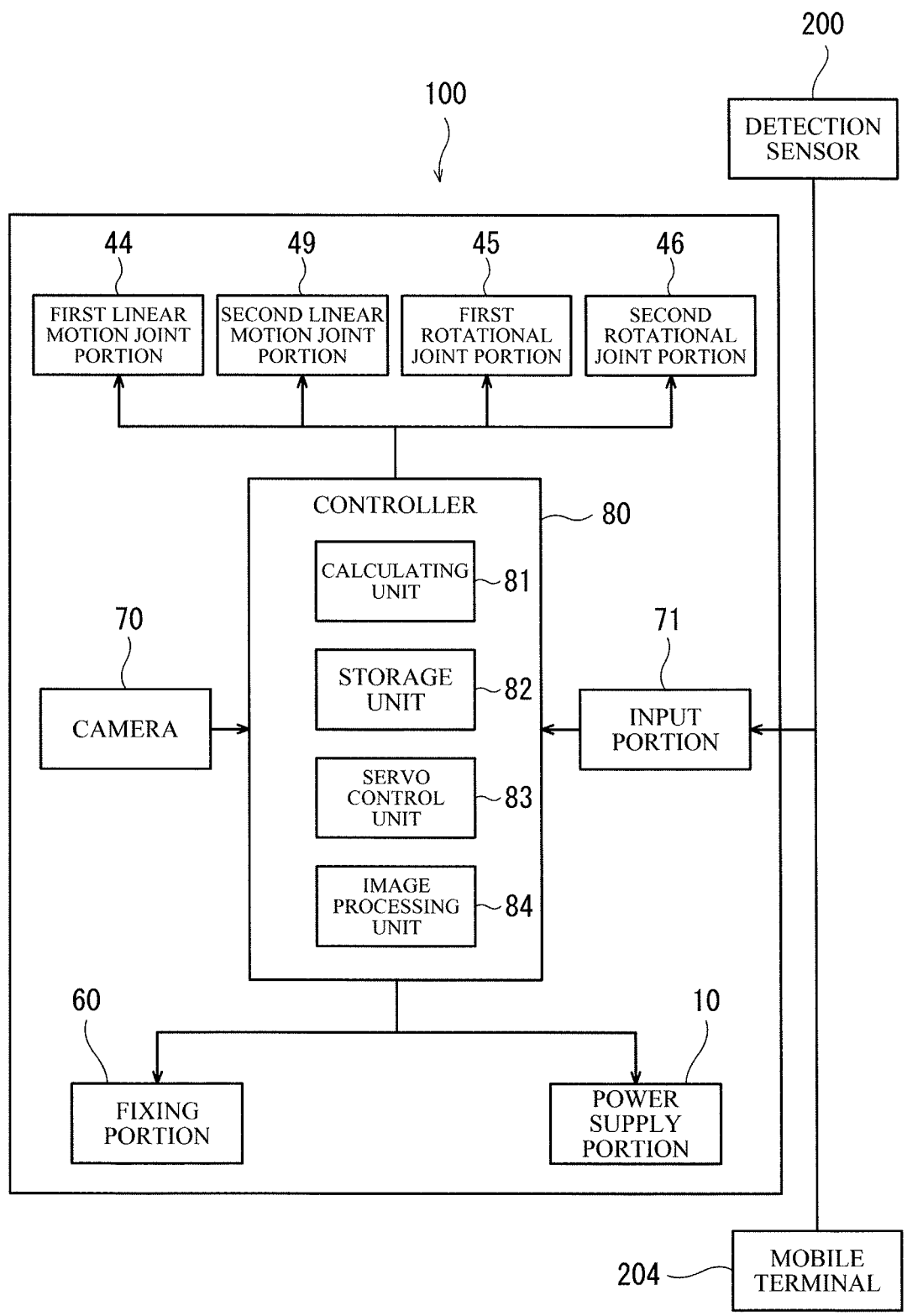
FIG. 3 is a functional block diagram showing the configuration of the power supply apparatus of FIG. 1.

Next, the controller 80 will be described with reference to FIG. 3. The controller 80 includes a calculating unit 81 (such as a CPU), a storage unit 82 (such as a ROM or a RAM), and a servo control unit 83. The controller 80 is a robot controller including a computer, such as a microcontroller. It should be noted that the controller 80 may be constituted by a single control device which performs centralized control or may be constituted by a plurality of control devices which cooperate to perform distributed control. The storage unit 82 is provided in the controller 80. However, the present embodiment is not limited to this. The storage unit 82 may be provided separately from the controller 80.

The storage unit 82 stores a basic program of the power supply apparatus 100 and information, such as various fixed data. The calculating unit 81 controls operations of respective portions of the power supply apparatus 100 by reading and executing software, such as the basic program, stored in the storage unit 82. To be specific, the calculating unit 81 generates a control command of the arm 40 and outputs the control command to the servo control unit 83. Based on the control command generated by the calculating unit 81, the servo control unit 83 controls the driving of the servomotors corresponding to the joint portions of the arm 40.

The controller 80 is electrically connected to the detection sensor 200. The controller 80 moves the arm 40 by controlling the joint portions in accordance with a signal output from the detection sensor 200. For example, when the person 203 is not detected but the car 201 is detected in the parking lot based on the detection signal supplied from the detection sensor 200, the controller 80 controls the joint portions to move the arm 40 such that the power supply portion 10 to be connected to the power receiving portion 202 of the car 201 is conveyed to a target position of the power supply portion 10.

The target position of the power supply portion 10 of the car 201 may be prestored in the storage unit 82. The controller 80 may use the target position of the power supply portion 10, the target position being taught by a mobile terminal 204 or manually. In this case, the controller 80 is connected to an input portion 71 included in the power supply apparatus 100, and the target position of the power supply portion 10 input from the input portion 71 is stored in the storage unit 82.

One example may be such that: a user moves the power supply portion 10 to a position where the power supply portion 10 is connected to the power receiving portion 202; and the user operates the input portion 71 to make the controller 80 store (register) the position in the storage unit 82 as the target position of the power supply portion 10. Another example may be such that: a user sends the position of the power receiving portion 202 by the mobile terminal 204, and the input portion 71 receives information of the position; and with this, the controller 80 registers the position in the storage unit 82 as the target position of the power supply portion 10.

The image processing unit 84 is provided at the controller 80. Based on a feature of the power receiving portion 202 that is a detection target prestored in the storage unit 82, the image processing unit 84 detects the power receiving portion 202 from the image output from the camera 70. Thus, the image processing unit 84 specifies the position of the power receiving portion 202. It should be noted that the image processing unit 84 is provided in the controller 80. However, the present embodiment is not limited to this. The image processing unit 84 may be provided separately from the controller 80.

The controller 80 controls the arm 40, the fixing portion 60, and the power supply portion 10 based on the information input from the detection sensor 200, the camera 70, and the input portion 71. It should be noted that a signal indicating that the coupling of the power supply portion 10 to the power receiving portion 202 is detected may be output to the controller 80 through a signal wire of the power supply line 51 of the power supply portion 10 from a switch (not shown) provided at the power supply portion 10.

Next, a power supplying method of the power supply apparatus 100 will be described with reference to FIGS. 1, 2, and 4 to 6. It should be noted that this power supply is controlled by the controller 80. The height of the power supply portion 10 of the power supply apparatus 100 is adjusted in advance by vertical lengths of the arm supporting portions 47 and 48 and/or the holder supporting portion 50 in accordance with the position of the power receiving portion 202 of the car 201.

First, as shown in FIG. 1, the detection sensor 200 monitors the existence of the car 201 and the person 203 in the parking lot for the car 201 at all times. When the detection sensor 200 detects that: the person 203 does not exist in the parking lot; and the car 201 is parked, the detection sensor 200 outputs a signal to the controller 80. With this, the power supply apparatus 100 can safely supply electric power to the car 201 when the person 203 is not in the parking lot.

Figure 2:
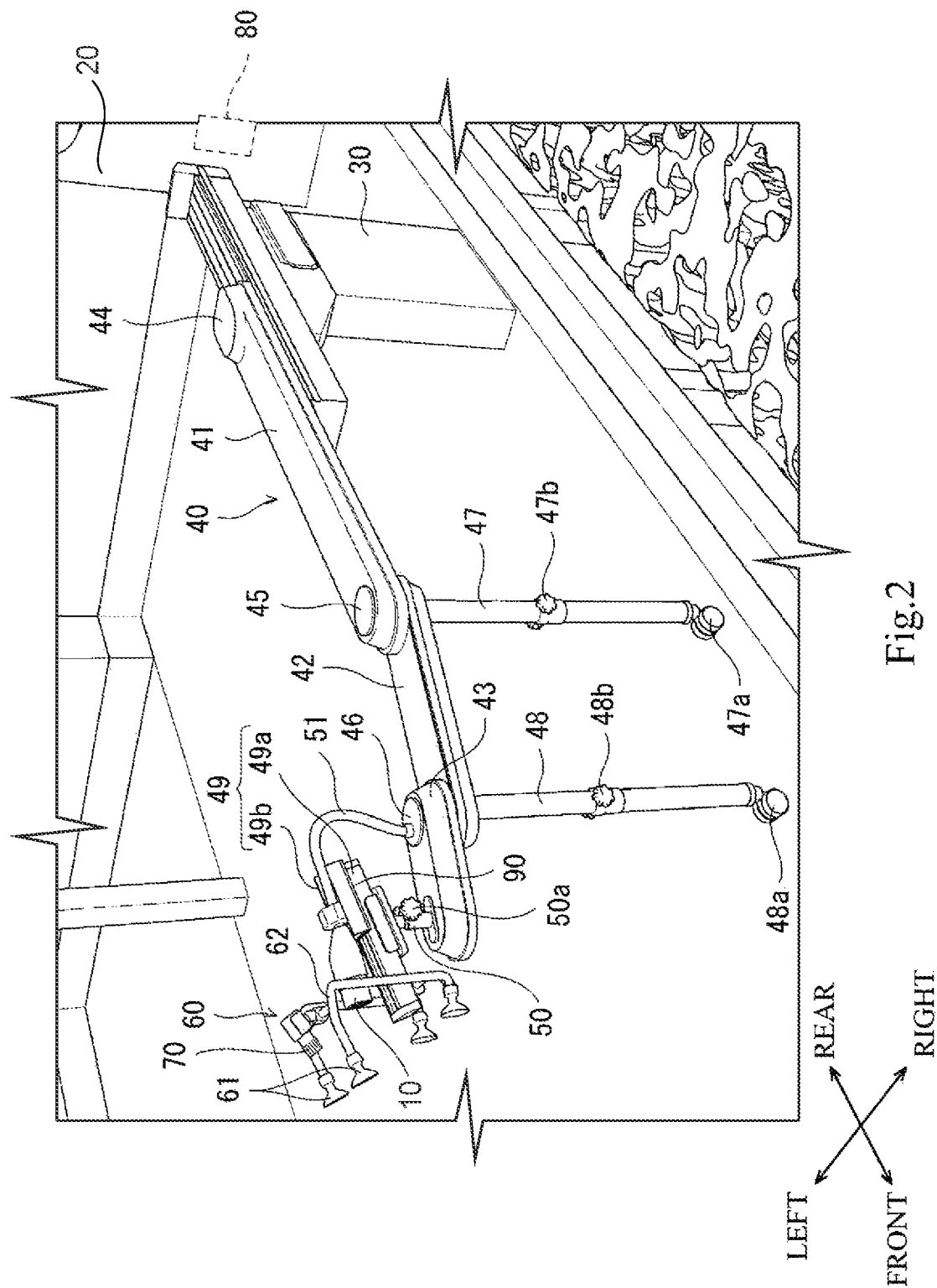
FIG. 2 is a perspective view showing an arm of the power supply apparatus of FIG. 1.

As shown in FIG. 2, based on the target position of the power supply portion 10 prestored in the storage unit 82, the controller 80 turns on and controls the servomotors of the joint portions of the arm 40. At this time, the first arm portion 41, the second arm portion 42, and the third arm portion 43 may be arranged so as to be linearly lined up in the front-rear direction. With this, the arm 40 becomes parallel to the car 201 that enters into the parking lot from the front side to the rear side. Thus, the arm 40 does not interfere with the parking of the car 201.

The controller 80 controls the first linear motion joint portion 44 to linearly move the first arm portion 41 forward relative to the base portion 30 of the arm 40, i.e., to extend the arm 40 along the car 201 in the front-rear direction. Then, the controller 80 controls the first rotational joint portion 45 and the second rotational joint portion 46 to bend the second arm portion 42 and the third arm portion 43 relative to the first arm portion 41 toward the car 201 located at the left side. With this, the power supply portion 10 provided at a tip end of the arm 40 approaches the target position where the power supply portion 10 is connected to the power receiving portion 202 of the car 201.

Figure 4:
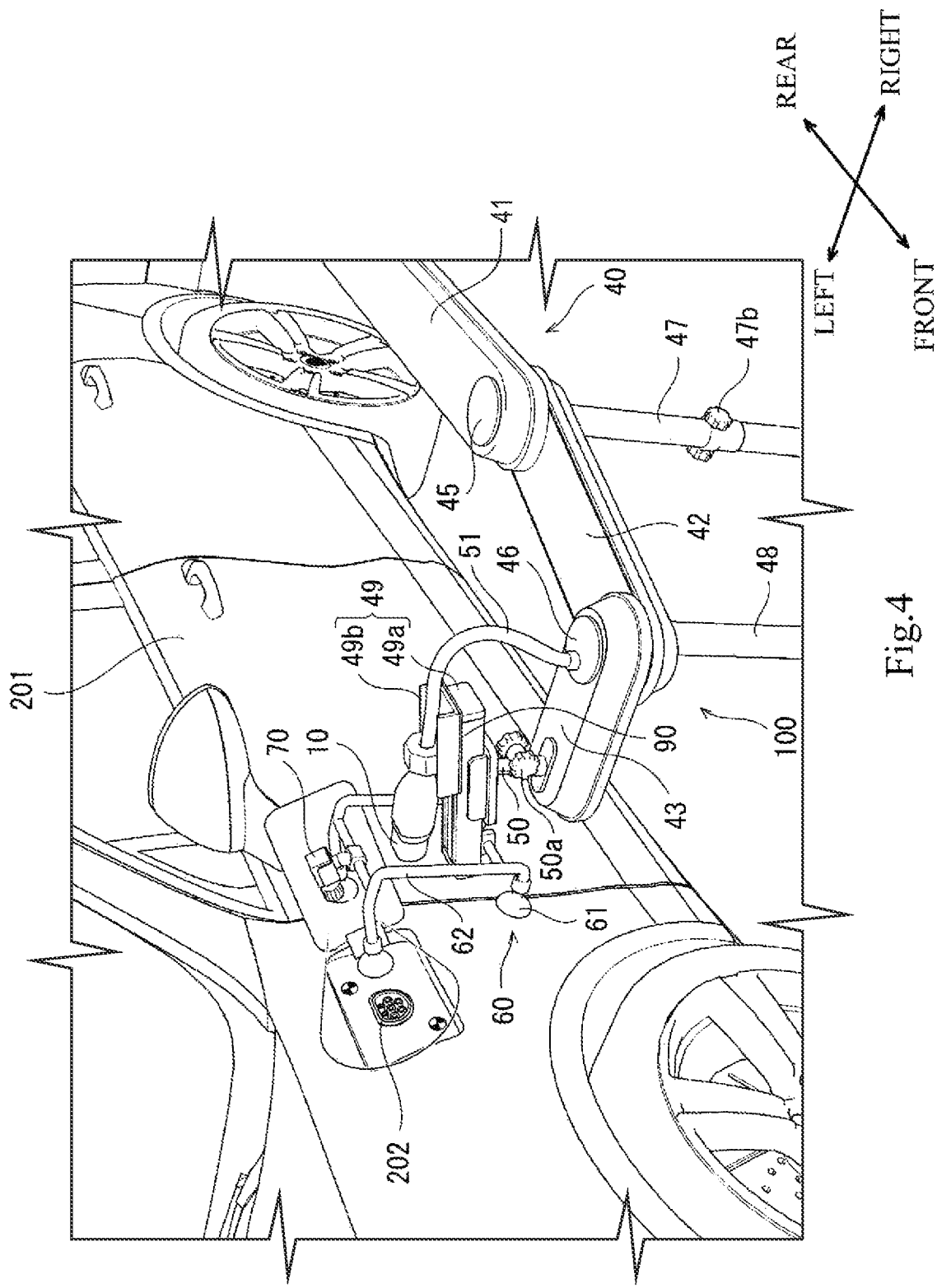
FIG. 4 is a perspective view showing the power supply apparatus in which a camera of FIG. 1 is taking an image of a power receiving portion.

It should be noted that since it is difficult to park the car 201 at a fixed position in the parking lot, the position of the power receiving portion 202 of the car 201 deviates from the stored position in some cases. Therefore, as shown in FIG. 4, the controller 80 acquires the position of the power receiving portion 202 of the car 201 in such a manner that: the camera 70 takes an image; and the image processing unit 84 analyses the image. The controller 80 controls the joint portions of the arm 40 such that the power supply portion 10 faces the power receiving portion 202. With this, the target position of the power supply portion 10 is finely adjusted with respect to the position of the power receiving portion 202. Thus, the power supply portion 10 is more accurately located at the position facing the power receiving portion 202.

Since the first rotational joint portion 45 and the second rotational joint portion 46 are provided, the angle of the power supply portion 10, provided at the tip end of the third arm portion 43, relative to the first arm portion 41 can be adjusted. Therefore, even when the car 201 is parked obliquely, the angle of the power supply portion 10 can be adjusted in accordance with the power receiving portion 202 such that the power supply portion 10 faces the power receiving portion 202.

Figure 5:
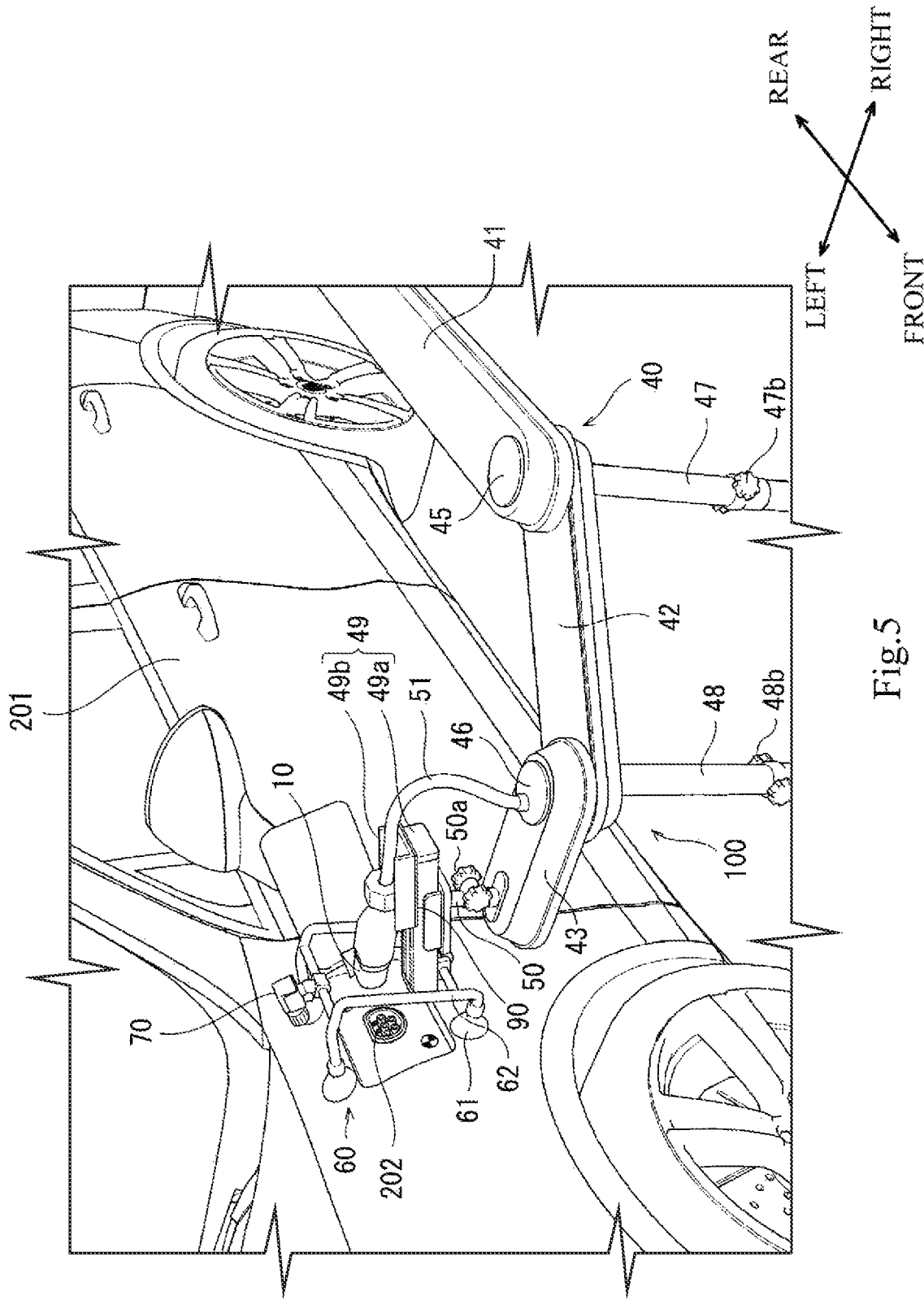
FIG. 5 is a perspective view showing the power supply apparatus in which a fixing portion of FIG. 4 sticks to a car.

As shown in FIG. 5, the controller 80 controls the joint portions of the arm 40 to make the tip end of the third arm portion 43 approach the car 201 with the power supply portion 10 facing the power receiving portion 202. At this time, the power supply portion 10 is located at the base end side of the holder 49a. Therefore, since the power supply portion 10 is located at the base end side of the tip end of the holder 49a, the power supply portion 10 is located away from the power receiving portion 202.

On the other hand, since the suction pads 61 of the fixing portion 60 are located in front of the tip end of the holder 49a, the suction pads 61 move toward the car 201 to reach the car 201. Then, the on-off portion of the pipe 62 of the fixing portion 60 is open, and the vacuum pump performs suction. With this, the suction pads 61 stick to the car 201, and the arm 40 to which the suction pads 61 are attached is fixed to the car 201. On this account, the servomotors of the joint portions of the arm 40 can be turned off, and this can realize energy saving.

Figure 6:
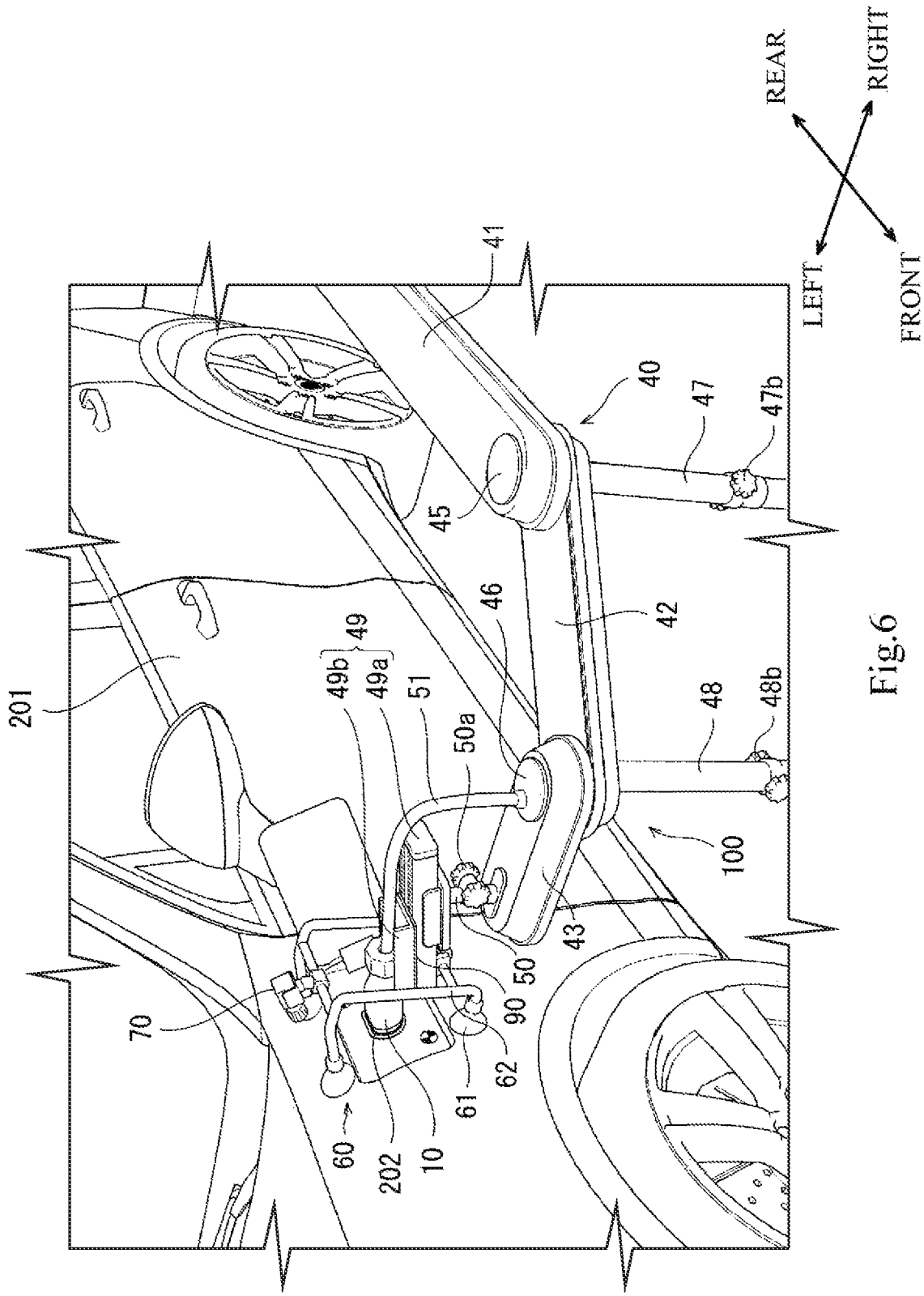
FIG. 6 is a perspective view showing the power supply apparatus in which a power supply portion of FIG. 5 is connected to the power receiving portion.
Figure 7:
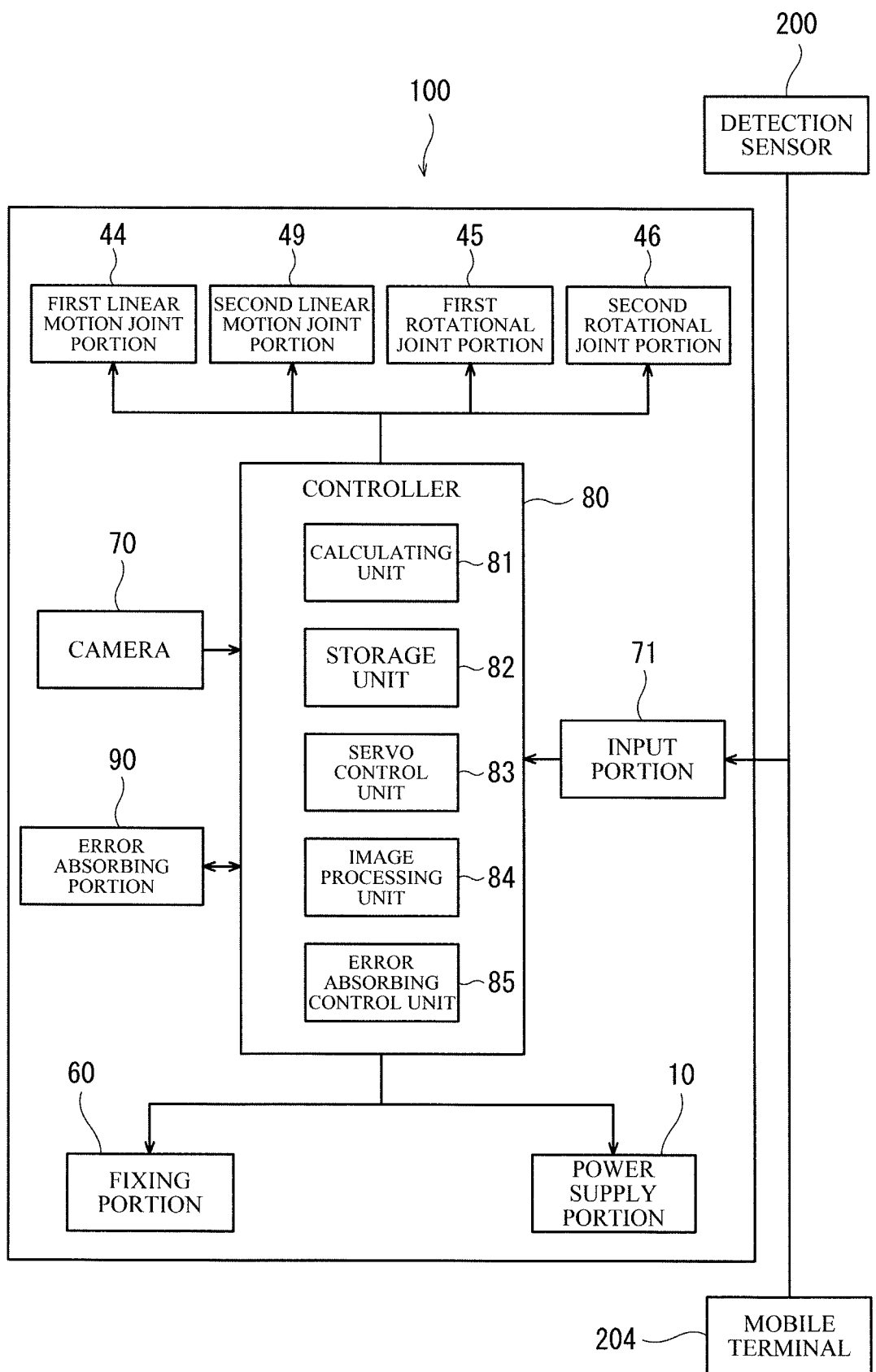
FIG. 7 is a functional block diagram showing the configuration of the power supply apparatus according to Embodiment 2 of the present invention.

As shown in FIG. 6, the controller 80 controls the second linear motion joint portion 49 to make the slider 49b slide from the base end side of the holder 49a of the second linear motion joint portion 49 toward the tip end side, i.e., to make the power supply portion 10, provided at the slider 49b, move forward. At this time, since the power supply portion 10 is located at the position facing the power receiving portion 202, and the holder 49a extends toward the power receiving portion 202, the power supply portion 10 moves toward the power receiving portion 202. Then, the power supply portion 10 further projects forward from the tip end of the holder 49a and is coupled to the power receiving portion 202. As above, regardless of the position where the car 201 is parked, the power supply portion 10 can be moved to an appropriate position relative to the power receiving portion 202. Thus, electric power loss by the positioning error of the power supply portion 10 relative to the power receiving portion 202 at the time of the power supply can be reduced.

When connecting the power supply portion 10 to the power receiving portion 202, the arm 40 is fixed to the car 201 by the fixing portion 60. Therefore, the power supply portion 10 can be inserted into and connected to the power receiving portion 202 by small force, so that the servomotor of the second linear motion joint portion 49 can be downsized.

When it is determined based on, for example, the passage of a predetermined period of time that supplying electric power from the power supply portion 10 to the power receiving portion 202 is completed, the controller 80 controls the second linear motion joint portion 49 to make the slider 49*b* slide from the tip end side of the holder 49*a* to the base end side, i.e., to make the power supply portion 10, provided at the slider 49*b*, retreat. The controller 80 closes the on-off portion of the pipe 62 of the fixing portion 60 and stops the suction of the vacuum pump. With this, the suction pads 61 stop sticking to the car 201 and are separated from the car 201. The controller 80 turns on and controls the servomotors of the joint portions of the arm 40 to arrange the first arm portion 41, the second arm portion 42, and the third arm portion 43 such that the first arm portion 41, the second arm portion 42, and the third arm portion 43 are linearly lined up in the front-rear direction. At this time, the controller 80 controls the first linear motion joint portion 44 to linearly move the first arm portion 41 backward toward the base portion 30 of the arm 40, i.e., to contract the arm 40 along the car 201 in the front-rear direction. With this, the arm 40 can be downsized in the parking lot.

According to the present embodiment, the controller 80 controls the first linear motion joint portion 44 and the first and second rotational joint portions 45 and 46 based on the image of the camera 70 to move the arm 40 such that the power supply portion 10 is connected to the power receiving portion 202. With this, the angle and position of the power supply portion 10 relative to the power receiving portion 202 are adjustable, so that the position or direction of the power supply portion 10 can be made most appropriate such that the power supply portion 10 is connected to the power receiving portion 202. Especially, since a home-use electrical apparatus, such as the car 201, is arranged at a predetermined position, and the position of the power receiving portion 202 is predetermined in the car 201, the power supply portion 10 can be easily moved to and connected to the power receiving portion 202 only by controlling the joint portions of the arm 40.

In the power supply apparatus 100, the arm 40 includes: the base portion 30 fixed to the ground surface and extending in the vertical direction; the first arm portion 41 coupled to the base portion 30 by the first linear motion joint portion 44 and extending in a direction intersecting with the base portion 30; and the second arm portion 42 coupled to the first arm portion 41 by the first rotational joint portion 45 and configured to rotate about a rotation axis, the rotation axis being provided in the linear movement direction of the first arm portion 41 and extending in the direction intersecting with the first arm portion 41. With this, during time other than the time of the power supply, the first arm portion 41 and the second arm portion 42 can be linearly lined up with the first arm portion 41 contracted at the base portion 30 side. With this, the arm 40 is downsized and arranged parallel to or substantially parallel to the car 201. Therefore, the arm 40 can be prevented from interfering with the parking of the car 201. On this account, the installation location is hardly restricted, and therefore, the power supply apparatus 100 can be installed at home. On the other hand, at the time of the power supply, the first arm portion 41 linearly moves in parallel or substantially parallel with the car 201, and the second arm portion 42 is bent relative to the first arm portion 41. Thus, the position and angle of the power supply portion 10 provided at the tip end of the arm 40 can be adjusted. With this, the power supply portion 10 can approach the power receiving portion 202 while preventing the car 201 from being damaged by the contact of the arm 40.

Further, the power supply apparatus 100 further includes the casters 47*a* and 48*a* provided at a lower portion of the arm 40 such that the arm 40 is movable. Since the arm 40 is supported by the casters 47*a* and 48*a* so as to be movable, the arm 40 itself does not have to support its own weight, and the arm portions 41, 42, and 43 and the servomotors of the joint portions of the arm 40 can be downsized.

The power supply apparatus 100 further includes the fixing portion 60 provided at the arm 40 and configured to fix the arm 40 to the car 201. With this, the fixing portion 60 receives resistance force generated when connecting the power supply portion 10, provided at the tip end of the arm 40, to the power receiving portion 202 of the car 201. On this account, the force of the arm 40 when connecting the power supply portion 10 to the power receiving portion 202 can be reduced. Thus, the movement speed of the arm 40 is lowered, and the servomotors of the joint portions of the arm 40 are downsized.

Further, the power supply apparatus 100 includes the storage unit 82 configured to store the position of the power receiving portion 202, the position being taught by the mobile terminal 204 or manually. The controller 80 moves the arm 40 based on the image of the camera 70 and the position of the power receiving portion 202 stored in the storage unit 82 such that the power supply portion 10 is connected to the power receiving portion 202. With this, the power supply portion 10 is moved based on the position of the power receiving portion 202 stored in the storage unit 82, and in addition, the power supply portion 10 is moved based on the position of the power receiving portion 202 obtained from the image of the camera 70. Thus, the position and angle of the power supply portion 10 can be more efficiently made most appropriate relative to the power receiving portion 202.

Embodiment 2

As shown in FIG. 2, the power supply apparatus 100 according to Embodiment 2 further includes an error absorbing portion 90 configured to displace the power supply portion 10 in accordance with reaction force generated when inserting the power supply portion 10 into the power receiving portion 202. The error absorbing portion 90 absorbs an error between an actual position of the power supply portion 10 moved by the arm 40 and the target position of the power supply portion 10. For example, a spherical bearing and a compliance unit are used as the error absorbing portion 90. The error absorbing portion 90 is arranged between the power supply portion 10 and the arm 40, such as between the power supply portion 10 and the second linear motion joint portion 49 or between the holder 49*a* and the slider 49*b*.

When the error absorbing portion 90 is fixed, the error absorbing portion 90 holds the power supply portion 10 such that the angle of the power supply portion 10 relative to the arm 40 is fixed. In contrast, when the fixing of the error absorbing portion 90 is canceled, the error absorbing portion 90 changes the angle of the power supply portion 10 relative to the arm 40.

The fixing of the error absorbing portion 90 is canceled when the power supply portion 10 reaches the car 201. For example, based on the image of the camera 70, a contact sensor configured to detect the contact of the power supply portion 10 with the car 201, the position of the arm 40, or a force sensor configured to detect force acting on the arm 40, the controller 80 determines that the power supply portion 10 has reached the car 201.

For example, when the power supply portion 10 reaches the power receiving portion 202, the controller 80 cancels the fixing of the error absorbing portion 90. At this time, if relative positions or postures of the power supply portion 10 and the power receiving portion 202 deviate from each other when inserting the power supply portion 10 into the power receiving portion 202, the power supply portion 10 and the power receiving portion 202 contact each other, and therefore, the reaction force is applied to the error absorbing portion 90 through the power supply portion 10. By the reaction force, the error absorbing portion 90 deforms, and this changes the position and angle of the power supply portion 10 relative to the power receiving portion 202.

As above, the error absorbing portion 90 displaces the power supply portion 10 so as to reduce the positioning error between the power receiving portion 202 and the power supply portion 10 and the angle deviation between the power receiving portion 202 and the power supply portion 10. With this, even if the positions or directions of the power receiving portion 202 and the power supply portion 10 slightly deviate from each other, the position error of the power supply portion 10 relative to the power receiving portion 202 is absorbed, and the position and direction of the power supply portion 10 relative to the power receiving portion 202 are made appropriate. Thus, the power supply portion 10 can be inserted into the power receiving portion 202.

OTHER EMBODIMENTS

In the above embodiments, the power supply apparatus 100 includes the camera 70. However, the power supply apparatus 100 does not have to include the camera 70. In this case, the controller 80 controls the first linear motion joint portion 44 and the first and second rotational joint portions 45 and 46 in the arm 40 such that the power supply portion 10 moves to the preset target position of the power supply portion 10. With this, the power supply portion 10 reaches the target position and is connected to the power receiving portion 202.

In the above embodiments, the vacuum suction body is used as the fixing portion 60 configured to fix the arm 40 to the car 201. However, an electromagnet may be used instead of the vacuum suction body. In this case, electric power is supplied to the electromagnet, and the electromagnet generates magnetic force. Thus, the arm 40 is fixed to the car 201 by the magnetic force. With this, the arm 40 can be fixed to the car 201 regardless of the shape of the car 201.

In the above embodiments, height adjusters 47b and 48b capable of adjusting the height of the arm 40 may be provided at the respective arm supporting portions 47 and 48. The height adjusters 47b and 48b may be able to change the heights of the arm supporting portions 47 and 48 by being operated with a human hand. Or, the height adjusters 47b and 48b may include respective motors, and the controller 80 may drive the motors to change the lengths of the arm supporting portions 47 and 48. As above, by changing the heights of the arm supporting portions 47 and 48, the height of the arm 40 supported by the arm supporting portions 47 and 48 and the height of the power supply portion 10 attached to the arm 40 can be adjusted in accordance with the height of the power receiving portion 202. With this, even when the height of the power receiving portion 202 of the car 201 changes by a change in tire pressure and a change in load, such as gasoline, the height of the power supply portion 10 relative to the power receiving portion 202 can be made most appropriate.

In the above embodiments, an angle adjuster 50a capable of adjusting the angle of the power supply portion 10 may be provided at the holder supporting portion 50. The angle adjuster 50a may be able to change the angle of the power supply portion 10 by being operated with a human hand. Or, the angle adjuster 50a may include a motor, and the controller 80 may drive the motor to change the angle of the holder supporting portion 50. As above, by changing the angle of the holder supporting portion 50, the angle of the holder 49a supported by the holder supporting portion 50 and the angle of the power supply portion 10 attached to the holder 49a so as to be slidable can be adjusted in accordance with the angle of the power receiving portion 202.

In the above embodiments, the arm 40 includes the first linear motion joint portion 44, the second linear motion joint portion 49, the first rotational joint portion 45, and the second rotational joint portion 46. However, the arm 40 is only required to include at least one of these joint portions.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The power supply apparatus of the present invention is useful as, for example, a power supply apparatus capable of more easily moving a power supply portion to a power receiving portion.

REFERENCE SIGNS LIST 10 power supply portion
40 articulated arm (arm)
41 first arm portion
42 second arm portion
44 first linear motion joint portion (linear motion joint portion)
45 first rotational joint portion (rotational joint portion)
47a caster
48a caster
60 fixing portion
70 camera
80 controller
82 storage unit
90 error absorbing portion
100 power supply apparatus
201 car (electrical apparatus)
202 power receiving portion

The invention claimed is:

1. A power supply apparatus comprising:
a power supply portion connected to a power receiving portion of an electrical apparatus and configured to supply electric power to the power receiving portion;
an arm including a tip end at which the power supply portion is provided, the arm further including at least one of a linear motion joint portion and a rotational joint portion;
a caster provided at a lower portion of the arm such that the arm is movable; and
a controller, wherein
the controller controls at least one of the linear motion joint portion and the rotational joint portion to move the arm such that the power supply portion is connected to the power receiving portion.

2. The power supply apparatus according to claim 1, further comprising a camera provided at the arm, wherein the controller controls at least one of the linear motion joint portion and the rotational joint portion based on an image of the camera to move the arm such that the power supply portion is connected to the power receiving portion.

3. The power supply apparatus according to claim 1, further comprising a fixing portion provided at the arm and configured to fix the arm to the electrical apparatus.

4. The power supply apparatus according to claim 1, further comprising an error absorbing portion configured to displace the power supply portion in accordance with reaction force generated when inserting the power supply portion into the power receiving portion.

5. A power supply apparatus comprising:
a power supply portion connected to a power receiving portion of an electrical apparatus and configured to supply electric power to the power receiving portion;
an arm including a tip end at which the power supply portion is provided, the arm further including at least one of a linear motion joint portion and a rotational joint portion;
a storage unit configured to store a position of the power receiving portion, the position being taught by a mobile terminal or manually; and
a controller, wherein
the controller controls at least one of the linear motion joint portion and the rotational joint portion based on the position of the power receiving portion stored in the storage unit, to move the arm such that the power supply portion is connected to the power receiving portion.

6. The power supply apparatus according to claim 5, further comprising a camera provided at the arm, wherein
the controller controls at least one of the linear motion joint portion and the rotational joint portion based on an image of the camera to move the arm such that the power supply portion is connected to the power receiving portion.

7. The power supply apparatus according to claim 5, further comprising a fixing portion provided at the arm and configured to fix the arm to the electrical apparatus.

8. The power supply apparatus according to claim 5, further comprising an error absorbing portion configured to displace the power supply portion in accordance with reaction force generated when inserting the power supply portion into the power receiving portion.

9. A power supply apparatus comprising:
a power supply portion connected to a power receiving portion of an electrical apparatus and configured to supply electric power to the power receiving portion;
an arm including a tip end at which the power supply portion is provided, the arm further including at least one of a linear motion joint portion and a rotational joint portion;
a base portion fixed to a ground surface and extending in a vertical direction; and
a controller, wherein:
the arm includes
a first arm portion that is arranged on the base portion, is coupled to the base portion by the linear motion joint portion, and extends in a direction intersecting with the vertical direction; and
a second arm portion coupled to the first arm portion by the rotational joint portion and configured to rotate about a rotation axis, the rotation axis being provided in a linear movement direction of the first arm portion and extending in a direction intersecting with the first arm portion; and
the controller controls at least one of the linear motion joint portion and the rotational joint portion to move the arm such that the power supply portion is connected to the power receiving portion.

10. The power supply apparatus according to claim 9, further comprising a camera provided at the arm, wherein
the controller controls at least one of the linear motion joint portion and the rotational joint portion based on an image of the camera to move the arm such that the power supply portion is connected to the power receiving portion.

11. The power supply apparatus according to claim 9, further comprising a fixing portion provided at the arm and configured to fix the arm to the electrical apparatus.

12. The power supply apparatus according to claim 9, further comprising an error absorbing portion configured to displace the power supply portion in accordance with reaction force generated when inserting the power supply portion into the power receiving portion.

13. A power supply apparatus comprising:
a power supply portion connected to a power receiving portion of an electrical apparatus and configured to supply electric power to the power receiving portion;
an arm including a tip end at which the power supply portion is provided, the arm further including at least one of a linear motion joint portion and a rotational joint portion;
a holder provided at the tip end of the arm;
a slider that holds the power supply portion and is slidable on the holder; and
a controller, wherein
the controller controls at least one of the linear motion joint portion and the rotational joint portion to move the arm and moves the slider on the holder such that the power supply portion is connected to the power receiving portion.

* * * * *